US009033255B2

(12) United States Patent
Tessier et al.

(10) Patent No.: US 9,033,255 B2
(45) Date of Patent: *May 19, 2015

(54) WIRELESS CONTROLLER WITH GATEWAY

(75) Inventors: Patrick C. Tessier, Oakdale, MN (US);
Jeffrey S. Hartzler, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/700,643

(22) Filed: Feb. 4, 2010

(65) Prior Publication Data
US 2010/0168924 A1 Jul. 1, 2010

Related U.S. Application Data

(63) Continuation of application No. 11/777,143, filed on Jul. 12, 2007, which is a continuation of application No. 10/792,027, filed on Mar. 2, 2004, now abandoned.

(51) Int. Cl.
*G05D 23/00* (2006.01)
*F24F 11/00* (2006.01)

(52) U.S. Cl.
CPC ....... *F24F 11/006* (2013.01); *F24F 2011/0068* (2013.01)
USPC .............................. 236/51; 236/94

(58) Field of Classification Search
CPC ............ F24F 11/006; F24F 2011/0068; F24F 2011/0075
USPC ........ 236/51, 94, 47; 702/57, 60, 61, 62, 182, 702/186, 189; 700/286, 291
See application file for complete search history.

(56) References Cited

U.S. PATENT DOCUMENTS 3,407,301 A 10/1968 Kovanic
3,656,112 A 4/1972 Paull
(Continued)

FOREIGN PATENT DOCUMENTS

DE 19750372 5/1999
DE 10064937 7/2002
(Continued)

OTHER PUBLICATIONS

All Non U.S. Patent References Have Been Previously Provided in Parent Application, U.S. Appl. No. 11/777,143, filed Jul. 12, 2007.
(Continued)

*Primary Examiner* — Jonathan Bradford
(74) *Attorney, Agent, or Firm* — Seager Tufte & Wickhem LLC

(57) ABSTRACT

Remote control of energy consumption is realized using a readily installable, flexible approach. According to an example embodiment of the present invention, a remote source communicates with a wireless controller for executing energy usage control. The remote source sends signals to the wireless controller via a gateway located near or, in one implementation, forming part of the wireless controller. In response to the signals, the wireless controller sets control settings for operating one or more of a variety of equipment types, such as a furnace, air conditioner, water heater or heat pump. With this approach, wired connections from the gateway to energy-consuming equipment do not necessarily need to be made in order to effect remote energy-consumption control. For instance, when used in connection with a controller wired to the energy-consuming equipment, the gateway need only communicate wirelessly with the controller and does not necessarily need to be coupled to the energy-consuming equipment. In addition, access to the energy-consuming equipment for establishing remote energy control is not necessary; rather, the remote energy control can be effected by accessing user-friendly locations, such as those where thermostats and other controllers are typically located.

17 Claims, 7 Drawing Sheets

(56) References Cited

U.S. PATENT DOCUMENTS

| | | | |
|---|---|---|---|
| 3,737,566 A | 6/1973 | Baer et al. | |
| 3,900,842 A | 8/1975 | Calabro et al. | |
| 3,993,861 A | 11/1976 | Baer | |
| 4,016,360 A | 4/1977 | Cane | |
| 4,034,362 A | 7/1977 | Balanca et al. | |
| 4,329,684 A | 5/1982 | Monteath et al. | |
| 4,357,665 A | 11/1982 | Korff | |
| 4,399,510 A | 8/1983 | Hicks | |
| 4,429,299 A | 1/1984 | Kabat et al. | |
| 4,433,719 A | 2/1984 | Cherry et al. | |
| 4,510,398 A | 4/1985 | Culp et al. | |
| 4,511,979 A | 4/1985 | Amirante | |
| 4,551,812 A | 11/1985 | Gurr et al. | |
| 4,556,865 A | 12/1985 | Fukagawa et al. | |
| 4,591,988 A | 5/1986 | Klima et al. | |
| 4,594,580 A | 6/1986 | Nelson | |
| 4,608,560 A | 8/1986 | Allgood | |
| 4,630,670 A | 12/1986 | Wellman et al. | |
| 4,642,607 A | 2/1987 | Strom et al. | |
| 4,656,835 A | 4/1987 | Kidder et al. | |
| 4,657,179 A | 4/1987 | Aggers et al. | |
| 4,734,871 A | 3/1988 | Tsunoda et al. | |
| 4,742,475 A | 5/1988 | Kaiser et al. | |
| 4,771,185 A | 9/1988 | Feron et al. | |
| 4,807,031 A | 2/1989 | Broughton et al. | |
| 4,860,950 A | 8/1989 | Reeser et al. | |
| 4,909,041 A | 3/1990 | Jones | |
| 4,916,328 A | 4/1990 | Culp, III | |
| 4,920,263 A | 4/1990 | Fimian et al. | |
| 4,924,404 A | 5/1990 | Reinke, Jr. | |
| 4,962,522 A | 10/1990 | Marian | |
| 4,969,508 A * | 11/1990 | Tate et al. | 165/209 |
| 4,999,617 A | 3/1991 | Uemura et al. | |
| 5,003,457 A | 3/1991 | Ikei et al. | |
| 5,003,591 A | 3/1991 | Kauffman et al. | |
| 5,042,265 A | 8/1991 | Baldwin et al. | |
| 5,051,720 A | 9/1991 | Kittirutsunetorn | |
| 5,086,385 A | 2/1992 | Launey et al. | |
| 5,109,222 A | 4/1992 | Welty | |
| 5,153,568 A | 10/1992 | Shaw | |
| 5,153,837 A | 10/1992 | Shaffer et al. | |
| 5,191,874 A | 3/1993 | McWilliams | |
| 5,197,862 A | 3/1993 | Kladder | |
| 5,228,077 A | 7/1993 | Darbee | |
| 5,231,488 A | 7/1993 | Mohrbacher et al. | |
| 5,268,995 A | 12/1993 | Diefendorff et al. | |
| 5,270,952 A | 12/1993 | Adams et al. | |
| 5,289,362 A | 2/1994 | Liebl et al. | |
| 5,309,509 A | 5/1994 | Cocklin et al. | |
| 5,333,054 A | 7/1994 | Tanaka et al. | |
| 5,341,988 A | 8/1994 | Rein et al. | |
| 5,347,110 A | 9/1994 | Audebert et al. | |
| 5,361,982 A * | 11/1994 | Liebl et al. | 236/46 R |
| 5,388,444 A | 2/1995 | Gerard | |
| 5,392,042 A | 2/1995 | Pellon | |
| 5,395,042 A | 3/1995 | Riley et al. | |
| 5,400,246 A | 3/1995 | Wilson et al. | |
| 5,410,326 A | 4/1995 | Goldstein | |
| 5,414,756 A | 5/1995 | Levine | |
| 5,419,489 A | 5/1995 | Burd | |
| 5,462,225 A | 10/1995 | Massara et al. | |
| 5,471,190 A | 11/1995 | Zimmermann | |
| 5,488,571 A | 1/1996 | Jacobs et al. | |
| 5,495,722 A | 3/1996 | Manson et al. | |
| 5,500,794 A | 3/1996 | Fujita et al. | |
| 5,521,966 A | 5/1996 | Friedes et al. | |
| 5,528,740 A | 6/1996 | Hill et al. | |
| 5,533,668 A * | 7/1996 | Erikson | 236/49.3 |
| 5,535,147 A | 7/1996 | Jacobs et al. | |
| 5,544,036 A | 8/1996 | Brown, Jr. et al. | |
| 5,551,797 A | 9/1996 | Sanford | |
| 5,553,123 A | 9/1996 | Chan et al. | |
| 5,557,254 A | 9/1996 | Johnson et al. | |
| 5,565,855 A | 10/1996 | Knibbe | |
| 5,570,297 A | 10/1996 | Brzezinski et al. | |
| 5,579,308 A | 11/1996 | Humpleman | |
| 5,590,831 A | 1/1997 | Manson et al. | |
| 5,592,188 A | 1/1997 | Doherty et al. | |
| 5,594,493 A | 1/1997 | Nemirofsky | |
| 5,600,711 A | 2/1997 | Yuen | |
| 5,608,655 A | 3/1997 | Moughanni et al. | |
| 5,619,555 A | 4/1997 | Fenton et al. | |
| 5,636,994 A | 6/1997 | Tong | |
| 5,644,173 A | 7/1997 | Elliason et al. | |
| 5,644,302 A | 7/1997 | Hana et al. | |
| 5,648,769 A | 7/1997 | Sato et al. | |
| 5,652,602 A | 7/1997 | Fishman et al. | |
| 5,706,191 A | 1/1998 | Bassett et al. | |
| 5,726,645 A | 3/1998 | Kamon et al. | |
| 5,729,474 A | 3/1998 | Hildebrand et al. | |
| 5,734,363 A | 3/1998 | Blouin et al. | |
| 5,743,465 A | 4/1998 | Jeong | |
| 5,745,068 A | 4/1998 | Takahashi et al. | |
| 5,746,602 A | 5/1998 | Kikinis | |
| 5,748,895 A | 5/1998 | Shiff et al. | |
| 5,752,880 A | 5/1998 | Gabao et al. | |
| 5,754,784 A | 5/1998 | Garland et al. | |
| 5,761,601 A | 6/1998 | Nemirofsky et al. | |
| 5,761,649 A | 6/1998 | Hill | |
| 5,767,896 A | 6/1998 | Nemirofsky | |
| 5,774,063 A | 6/1998 | Berry et al. | |
| 5,774,664 A | 6/1998 | Hidary et al. | |
| 5,774,667 A | 6/1998 | Garvey et al. | |
| 5,781,125 A | 7/1998 | Godau et al. | |
| 5,790,977 A | 8/1998 | Ezekiel | |
| 5,801,664 A | 9/1998 | Seidensticker et al. | |
| 5,801,940 A | 9/1998 | Russ et al. | |
| 5,802,467 A | 9/1998 | Salazar et al. | |
| 5,805,443 A | 9/1998 | Raffray et al. | |
| 5,805,676 A | 9/1998 | Martino | |
| 5,815,086 A | 9/1998 | Ivie et al. | |
| 5,818,428 A | 10/1998 | Eisenbrandt et al. | |
| 5,819,039 A | 10/1998 | Morgaine | |
| 5,819,294 A | 10/1998 | Chambers | |
| 5,833,134 A * | 11/1998 | Ho et al. | 236/49.3 |
| 5,836,815 A | 11/1998 | Jennemann | |
| 5,838,910 A | 11/1998 | Domenikos et al. | |
| 5,838,916 A | 11/1998 | Domenikos et al. | |
| 5,839,654 A | 11/1998 | Weber | |
| 5,850,304 A | 12/1998 | Elmers et al. | |
| 5,852,615 A | 12/1998 | Holo et al. | |
| 5,853,123 A | 12/1998 | Okano et al. | |
| 5,873,765 A | 2/1999 | Rifkin et al. | |
| 5,875,430 A | 2/1999 | Koether | |
| 5,880,769 A | 3/1999 | Nemirofsky et al. | |
| 5,905,486 A | 5/1999 | Brittenham et al. | |
| 5,907,350 A | 5/1999 | Nemirofsky | |
| 5,926,776 A * | 7/1999 | Glorioso et al. | 702/130 |
| 5,927,599 A | 7/1999 | Kath | |
| 5,953,047 A | 9/1999 | Nemirofsky | |
| 5,956,487 A | 9/1999 | Venkatraman et al. | |
| 5,975,737 A | 11/1999 | Crater et al. | |
| 5,982,362 A | 11/1999 | Crater et al. | |
| 5,999,740 A | 12/1999 | Rowley | |
| 6,049,778 A | 4/2000 | Walker et al. | |
| 6,061,603 A | 5/2000 | Papadopoulos et al. | |
| 6,067,477 A | 5/2000 | Wewalaarachchi et al. | |
| 6,088,621 A | 7/2000 | Woytowitz et al. | |
| 6,088,688 A | 7/2000 | Crooks et al. | |
| 6,112,127 A | 8/2000 | Bennett | |
| 6,121,593 A | 9/2000 | Mansbery et al. | |
| 6,122,603 A | 9/2000 | Budike, Jr. | |
| 6,138,150 A | 10/2000 | Nichols et al. | |
| 6,139,177 A | 10/2000 | Venkatraman et al. | |
| 6,152,375 A | 11/2000 | Robison | |
| 6,157,943 A | 12/2000 | Meyer | |
| 6,157,982 A | 12/2000 | Deo et al. | |
| 6,160,359 A | 12/2000 | Fleischmann | |
| 6,161,133 A | 12/2000 | Kikinis | |
| 6,167,766 B1 | 1/2001 | Dunn et al. | |
| 6,175,931 B1 | 1/2001 | Hornung | |
| 6,185,491 B1 | 2/2001 | Gray et al. | |
| 6,192,282 B1 | 2/2001 | Smith et al. | |
| 6,213,404 B1 | 4/2001 | Dushane et al. | |

(56) References Cited

U.S. PATENT DOCUMENTS

| | | | |
|---|---|---|---|
| 6,256,378 B1 | 7/2001 | Iggulden et al. | |
| 6,275,166 B1 | 8/2001 | Del Castillo et al. | |
| 6,281,820 B1 | 8/2001 | Fields | |
| 6,282,454 B1 | 8/2001 | Papadopoulos et al. | |
| 6,311,105 B1 | 10/2001 | Budike, Jr. | |
| 6,334,107 B1 | 12/2001 | Gale et al. | |
| 6,347,692 B1 | 2/2002 | Hoyte et al. | |
| 6,349,883 B1 | 2/2002 | Simmons et al. | |
| 6,351,693 B1 | 2/2002 | Monie et al. | |
| 6,353,853 B1 | 3/2002 | Gravlin | |
| 6,370,141 B1 | 4/2002 | Giordano, III et al. | |
| 6,385,510 B1 | 5/2002 | Hoog et al. | |
| 6,385,542 B1 | 5/2002 | Millington | |
| 6,394,359 B1 | 5/2002 | Morgan | |
| 6,405,099 B1 | 6/2002 | Nagal et al. | |
| 6,415,023 B2 | 7/2002 | Iggulden et al. | |
| 6,437,692 B1 * | 8/2002 | Petite et al. | 340/540 |
| 6,449,533 B1 | 9/2002 | Mueller et al. | |
| 6,466,145 B2 | 10/2002 | Fields | |
| 6,466,971 B1 | 10/2002 | Humpleman et al. | |
| 6,467,054 B1 | 10/2002 | Lenny | |
| 6,483,906 B1 | 11/2002 | Iggulden et al. | |
| 6,484,061 B2 | 11/2002 | Papadopoulos et al. | |
| 6,487,717 B1 | 11/2002 | Brunemann et al. | |
| 6,493,425 B1 | 12/2002 | Abe | |
| 6,496,858 B1 | 12/2002 | Frailong et al. | |
| 6,505,243 B1 | 1/2003 | Lortz | |
| 6,508,407 B1 | 1/2003 | Lefkowitz et al. | |
| 6,510,212 B2 | 1/2003 | Ito et al. | |
| 6,535,838 B2 | 3/2003 | Abraham et al. | |
| 6,539,499 B1 | 3/2003 | Stedman et al. | |
| 6,557,054 B2 | 4/2003 | Reisman | |
| 6,571,140 B1 | 5/2003 | Wewalaarachchi et al. | |
| 6,574,581 B1 | 6/2003 | Bohrer et al. | |
| 6,574,672 B1 | 6/2003 | Mitchell et al. | |
| 6,584,113 B1 | 6/2003 | Manduley et al. | |
| 6,584,430 B1 | 6/2003 | Rosenbaum et al. | |
| 6,598,056 B1 | 7/2003 | Hull et al. | |
| 6,601,086 B1 | 7/2003 | Howard et al. | |
| 6,619,055 B1 | 9/2003 | Addy | |
| 6,622,097 B2 | 9/2003 | Hunter | |
| 6,636,893 B1 | 10/2003 | Fong et al. | |
| 6,643,611 B1 | 11/2003 | Ito et al. | |
| 6,658,372 B2 | 12/2003 | Raffaelli et al. | |
| 6,658,586 B1 | 12/2003 | Levi | |
| 6,658,856 B2 | 12/2003 | Critchley | |
| 6,665,871 B1 | 12/2003 | Macrae et al. | |
| 6,671,586 B2 | 12/2003 | Davis et al. | |
| 6,675,193 B1 | 1/2004 | Slavin et al. | |
| 6,692,349 B1 | 2/2004 | Brinkerhoff et al. | |
| 6,693,999 B2 | 2/2004 | Ito et al. | |
| 6,697,894 B1 | 2/2004 | Mitchell et al. | |
| 6,704,401 B2 | 3/2004 | Piepho et al. | |
| 6,708,072 B2 | 3/2004 | Arima et al. | |
| 6,711,470 B1 | 3/2004 | Hartenstein et al. | |
| 6,721,607 B2 | 4/2004 | Brault | |
| 6,754,707 B2 | 6/2004 | Richards et al. | |
| 6,766,223 B1 * | 7/2004 | Motoyama | 700/286 |
| 6,775,603 B2 | 8/2004 | Yester et al. | |
| 6,778,745 B2 | 8/2004 | Debban, Jr. et al. | |
| 6,778,945 B2 | 8/2004 | Chassin et al. | |
| 6,782,345 B1 | 8/2004 | Siegel et al. | |
| 6,785,630 B2 * | 8/2004 | Kolk et al. | 702/130 |
| 6,792,321 B2 | 9/2004 | Sepe, Jr. | |
| 6,812,888 B2 | 11/2004 | Drury et al. | |
| 6,826,512 B2 | 11/2004 | Dara-Abrams et al. | |
| 6,832,199 B1 | 12/2004 | Kucek et al. | |
| 6,836,737 B2 | 12/2004 | Petite et al. | |
| 6,844,807 B2 | 1/2005 | Inoue et al. | |
| 6,847,916 B1 | 1/2005 | Ying | |
| 6,853,958 B1 | 2/2005 | Turin et al. | |
| 6,854,010 B1 | 2/2005 | Christian et al. | |
| 6,857,013 B2 | 2/2005 | Ramberg et al. | |
| 6,859,669 B2 | 2/2005 | An | |
| 6,868,293 B1 * | 3/2005 | Schurr et al. | 700/22 |
| 6,874,691 B1 | 4/2005 | Hildebrand et al. | |
| 6,882,712 B1 | 4/2005 | Iggulden et al. | |
| 6,891,838 B1 | 5/2005 | Petite et al. | |
| 6,892,225 B1 | 5/2005 | Tu et al. | |
| 6,947,675 B2 | 9/2005 | Koyama et al. | |
| 6,965,935 B2 | 11/2005 | Diong | |
| 6,970,539 B2 | 11/2005 | Yamamoto et al. | |
| 6,975,958 B2 | 12/2005 | Bohrer et al. | |
| 7,002,462 B2 | 2/2006 | Welch | |
| 7,035,668 B2 | 4/2006 | Kobayashi | |
| 7,035,768 B2 | 4/2006 | Matsuda | |
| 7,039,404 B2 * | 5/2006 | Das et al. | 455/435.1 |
| 7,058,508 B2 | 6/2006 | Combs et al. | |
| 7,072,945 B1 | 7/2006 | Nieminen et al. | |
| 7,089,088 B2 | 8/2006 | Terry et al. | |
| 7,092,794 B1 | 8/2006 | Hill et al. | |
| 7,117,239 B1 | 10/2006 | Hansen | |
| 7,130,719 B2 | 10/2006 | Ehlers et al. | |
| 7,149,792 B1 | 12/2006 | Hansen et al. | |
| 7,178,149 B2 | 2/2007 | Hansen | |
| 7,185,014 B1 | 2/2007 | Hansen | |
| 7,215,746 B2 | 5/2007 | Iggulden et al. | |
| 7,243,174 B2 | 7/2007 | Sheahan et al. | |
| 7,257,426 B1 | 8/2007 | Witkowski et al. | |
| 7,274,972 B2 | 9/2007 | Amundson et al. | |
| 7,277,699 B2 | 10/2007 | Ito et al. | |
| 7,289,611 B2 | 10/2007 | Iggulden et al. | |
| 7,346,467 B2 | 3/2008 | Bohrer et al. | |
| 7,363,031 B1 | 4/2008 | Aisa | |
| 7,379,541 B2 | 5/2008 | Iggulden et al. | |
| 7,383,158 B2 | 6/2008 | Krocker et al. | |
| 7,400,107 B2 | 7/2008 | Schneider et al. | |
| 7,415,102 B2 | 8/2008 | Iggulden et al. | |
| 7,734,724 B2 | 6/2010 | Rezvani et al. | |
| 7,849,301 B2 | 12/2010 | Kwong et al. | |
| 7,937,370 B2 | 5/2011 | Hansen | |
| 7,966,418 B2 | 6/2011 | Shedrinsky | |
| 8,046,800 B2 | 10/2011 | Daniels | |
| 8,055,758 B2 | 11/2011 | Hansen | |
| 8,060,886 B2 | 11/2011 | Hansen | |
| 8,065,397 B2 | 11/2011 | Taylor et al. | |
| 8,108,543 B2 | 1/2012 | Hansen | |
| 8,204,189 B2 | 6/2012 | Rhodes et al. | |
| 8,291,039 B2 | 10/2012 | Shedrinsky | |
| 8,332,178 B2 | 12/2012 | Simons | |
| 8,370,479 B2 | 2/2013 | Hart et al. | |
| 8,406,119 B2 | 3/2013 | Taylor et al. | |
| 8,478,861 B2 | 7/2013 | Taylor et al. | |
| 8,627,274 B2 | 1/2014 | Peraza et al. | |
| 8,752,074 B2 | 6/2014 | Hansen | |
| 8,762,497 B2 | 6/2014 | Hansen | |
| 8,769,095 B2 | 7/2014 | Hart et al. | |
| 8,788,632 B2 | 7/2014 | Taylor et al. | |
| 8,811,580 B2 | 8/2014 | Iggulden et al. | |
| 2001/0043686 A1 | 11/2001 | Iggulden | |
| 2002/0035429 A1 | 3/2002 | Banas | |
| 2002/0095269 A1 | 7/2002 | Natalini et al. | |
| 2002/0097851 A1 | 7/2002 | Daum et al. | |
| 2002/0111698 A1 | 8/2002 | Graziano et al. | |
| 2002/0147804 A1 | 10/2002 | Cosman et al. | |
| 2002/0147806 A1 | 10/2002 | Hasegawa | |
| 2002/0196158 A1 | 12/2002 | Lee | |
| 2002/0198990 A1 | 12/2002 | Bradfield et al. | |
| 2003/0031465 A1 | 2/2003 | Blake | |
| 2003/0034898 A1 | 2/2003 | Shamoon et al. | |
| 2003/0050737 A1 | 3/2003 | Osann, Jr. | |
| 2003/0101262 A1 | 5/2003 | Godwin | |
| 2004/0014842 A1 | 1/2004 | Takeda et al. | |
| 2004/0034484 A1 * | 2/2004 | Solomita et al. | 702/62 |
| 2004/0158371 A1 | 8/2004 | Iggulden et al. | |
| 2004/0160319 A1 | 8/2004 | Joao | |
| 2004/0232345 A1 | 11/2004 | Jagam et al. | |
| 2005/0033707 A1 | 2/2005 | Ehlers et al. | |
| 2005/0130652 A1 | 6/2005 | O'Toole et al. | |
| 2005/0164678 A1 | 7/2005 | Rezvani et al. | |
| 2005/0195757 A1 | 9/2005 | Kidder et al. | |
| 2005/0240312 A1 | 10/2005 | Terry et al. | |
| 2005/0270151 A1 | 12/2005 | Winick | |
| 2007/0114295 A1 | 5/2007 | Jenkins | |

(56) References Cited

U.S. PATENT DOCUMENTS

| | | | |
|---|---|---|---|
| 2007/0147806 | A1 | 6/2007 | Schneider et al. |
| 2008/0015740 | A1 | 1/2008 | Osann, Jr. |
| 2008/0222276 | A1 | 9/2008 | Thibault et al. |
| 2011/0178656 | A1 | 7/2011 | Iggulden et al. |
| 2012/0136964 | A1 | 5/2012 | Iggulden et al. |

FOREIGN PATENT DOCUMENTS

| | | | |
|---|---|---|---|
| DE | 10131395 | | 1/2003 |
| EP | 0754940 | | 1/1997 |
| EP | 0803808 | | 10/1997 |
| EP | 0837599 | | 4/1998 |
| EP | 1196002 | | 4/2002 |
| EP | 1489357 | | 12/2004 |
| EP | 1196003 | | 3/2009 |
| GB | 2403097 | | 12/2004 |
| GB | 2403097 | A * | 12/2004 |
| JP | 10276478 | | 10/1998 |
| JP | 2002044750 | | 2/2002 |
| JP | 2003209893 | | 7/2003 |
| WO | WO 9712486 | | 4/1997 |
| WO | WO 9718636 | | 5/1997 |
| WO | WO 9730375 | | 8/1997 |
| WO | WO 9838570 | | 9/1998 |
| WO | WO 9965192 | | 12/1999 |
| WO | WO 0001169 | | 6/2000 |
| WO | WO 0043870 | | 7/2000 |

OTHER PUBLICATIONS

Reza S. Raji, "Smart Networks for Control," IEEE Spectrum, pp. 49-55, Jun. 1994.
Facility Robotics Solutions Direct, "Who We Are and What We Do," 2 pages, Sep. 19, 1997.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
"Energy User News," 4 pages, Mar. 1, 1997.
"RTCA's E-Smart Radon Monitoring Service," Radon Testing Corporation of America, 3 pages, prior to Jan. 11, 2006.
Andover Controls, "Andover Controls World," 4 pages, 1997.
Andover Controls, "Facility Management Unleashed," 6 pages, 2002.
Andover Controls, "Network News," vol. 2, No. 2, 8 pages, 1997.
Clapman et al., "An SNMP-Based Approach for Home Bus Network Management," Proceedings of the International Conference on Consumer Electronics, 4 pages, Jun. 8-10, 1992.
U.S. Appl. No. 60/368,963, 202 pages, filed Mar. 28, 2002.
U.S. Appl. No. 60/383,027, 26 pages, filed May 24, 2002.
Corcoran et al., "A Remote Electronic Object Emulation System for Home Bus Applications," IEEE Transactions on Consumer Electronics, vol. 40, Issue 3, (1994), 405-410.
Creston Control Products Catalog, Creston Electronics Inc., 100 pages, 1998 (This reference was cited in U.S. Appl. No. 12/033,821, filed Feb. 19, 2008).
Creston e-Control® Reference Guide, Creston Electronics Inc., Technical Documentation Department, 74 pages, 2002 (This reference was cited in U.S. Appl. No. 12/033,821, filed Feb. 19, 2008).
Creston e-control™ delivers media management and A/V control solutions at the University of Wisconsin, Creston Electronics Inc., 1 page, 1999 (This reference was cited in U.S. Appl. No. 12/033,821, filed Feb. 19, 2008).
Creston e-control™ provides the Internet-based control solution for Cisco, Creston Electronics, Inc., 1 page, 1999 (This reference was cited in U.S. Appl. No. 12/033,821, filed Feb. 19, 2008).
Creston e-control™: Getting Started, Creston Electronics Inc., 1 page, 1999 (This reference was cited in U.S. Appl. No. 12/033,821, filed Feb. 19, 2008).
Draft Request for Inter Partes Review of U.S. Patent No. 7,415,102 by Ecobee Inc., Received Sep. 18, 2012. (This reference was cited in U.S. Appl. No. 13/363,145, filed Jan. 31, 2012).
Facility Robotics Solutions, "Where Can I go to Find Everything I Need to Put Together LonWorks-Based Automation Systems?," 5 pages, prior to Jun. 28, 2007.
Hai Home Automation Inc., PCStat Software Owner's Manual, Release 1.1, Document No. 16R00, Revision B, 15 pages, Apr. 1998.
Kirschner, "Wired Wheels," Popular Science, 54-55, Mar. 1998.
Lelek et al., "Proposal for Commissioning Services" Ashland High School, Aug. 29, 2003.
Lind et al., "The Network Vehicle—A Glimpse into the Future of Mobile Media," IEEE AES Systems Magazine, 27-32, Dec. 15, 1998.
Matty, "Advanced Energy Management for Home Use", in IEEE Transactions on Consumer Electronics. vol. 35. No. 3, Aug. 1989.
Microsoft Corporation, "Setting Up Your Cordless Phone is Easy," website printout, Dec. 15, 1998. (This reference was cited in U.S. Appl. No. 13/363,145, filed Jan. 31, 2013).
MisterHouse Operational question, http://misterhouse.sourceforge.net/faq/html, 34 pages, accessed via Internet on Jul. 27, 2011.
NBX Corportation, "Product Solutions; NBX NetSet Application Notes: NBX NetSettTM Administration Utility," website printout, Dec. 14, 1998.
NBX Corportation, "Product Solutions; NBX NetSet Application Notes: NBX NetSettTM Administration Utility," website printout, Dec. 14, 1998 (This reference was cited in U.S. Appl. No. 12/033,821, filed Feb. 19, 2008).
Program listing for MisterHouse, http://misterhouse.svn.sourceforge.net/svnroot/misterhouse/trunk/lib/http_server.pl, 35 pages, Jul. 27, 2011.
Renovated San Francisco City Hall features latest Creston control Technology, Creston Electronics Inc., 1 page, 1999.
Renovated San Francisco City Hall features latest Creston control Technology, Creston Electronics Inc., 1 page, (This reference was cited in U.S. Appl. No. 12/033,821, filed Feb. 19, 2008).
Raji, "Smart Networks for Control." Jun. 1994, IEEE Spectrum, pp. 49-55.
Shear, "GoingGlobal in the Real World: Putting and Embedded System on the internet," EDN Electrical Design News, Cahners Publishing Co., Newton, Massachusetts, vol. 42, No. 19, pp. 37-46, Sep. 12, 1997.
The Network Vehivle, Presented at COMDEX, 2 pages, 1997.
The Trane Company, Trane Building Management Systems, American Standard Inc., 34 pages, 1996 (This reference was cited in U.S. Appl. No. 12/033,821, filed Feb. 19, 2008).
US Office Action dated Dec. 16, 2014, issued in child U.S. Appl. No. 14/521,305.

* cited by examiner

US 9,033,255 B2

WIRELESS CONTROLLER WITH GATEWAY

PRIORITY STATEMENT

This is a continuation of U.S. patent application Ser. No. 11/777,143 filed Jul. 12, 2007, entitled "WIRELESS CONTROLLER WITH GATEWAY", which is a continuation of U.S. patent application Ser. No. 10/792,027 filed Mar. 2, 2004, entitled "WIRELESS CONTROLLER WITH GATEWAY".

FIELD OF THE INVENTION

This invention relates in general to utility consumption control, and more particularly to a controller with a local gateway for executing remote utility consumption control.

BACKGROUND OF THE INVENTION

Electronic controllers such as thermostats and fan controls are used to control a variety of heating, ventilating and air conditioning (HVAC) equipment as well as other fuel and power consumption equipment. Furnaces, heat pumps, gas burners, water heaters, electric radiators, water radiators, air conditioners, chillers, fans, blowers and humidity controllers are example types of equipment for which electronic controllers are used. These equipment types are often grouped into the category called "HVAC." Controllers for these equipment types are often located in user-accessible locations that are remote from the controlled equipment. For instance, thermostats are commonly placed on interior walls of a dwelling and located remotely from controlled HVAC equipment that is located, for example, in a utility room or a basement. Typical controllers accept user inputs received via keypads or other input devices and use the inputs to generate control outputs for controlling HVAC equipment and other equipment types. Often, the controller also includes and/or is coupled to a temperature sensor and accepts temperature set point inputs. Control signals are sent to HVAC equipment as a function of the set point inputs and an output from the temperature sensor. For instance, when in a furnace system is in heating mode, a signal calling for heat is sent to the furnace in response to sensing that a temperature that is lower than a set point.

Residential and industrial HVAC type applications rely upon utility providers to supply the electricity and/or fuel required for operation of HVAC equipment. One challenge confronting such utility providers today is the great variance in total demand on a network between peak and off-peak times during the day. Peak demand periods are intervals of very high demand on power generating equipment or on fuel supply where load shedding may be necessary to maintain proper service to the network. These periods occur, for example, during hot summer days occasioned by the widespread simultaneous usage of electrical air conditioning devices or during the coldest winter months in areas where a strong heating load is required.

Another characteristic of utility supply and usage (e.g., electric and/or fuel usage) is the variance in cost of the utility being supplied under different conditions. For instance the cost of providing a utility can increase during peak supply times due to a variety of conditions. The efficiency of power generation or fuel supply equipment, limitations in a utility distribution network, economical cost/demand relationships and other factors all affect utility costs. In this regard, certain customers are amenable to relinquishing the control of their utility requirements as a function of cost, and certain utilities preferably charge for services as a function of the time at which usage occurs.

Several basic strategies and devices have been utilized for controlling HVAC equipment in order to limit the peak power demand on the power and fuel generating capacity of utility companies. One such approach involves sending signals from a utility to disconnect or interrupt the use of certain selected HVAC loads (e.g., air conditioning compressors) when demand has reached a certain point. Another approach involves assuming control of a setpoint function of a thermostat associated with HVAC equipment. The overriding control functions cause the setpoint to change to use less power or fuel at times of high demand or high unit cost.

Such approaches can be implemented for reducing power or fuel consumption during peak demand times or other times when the reduction in utility usage is desirable, such as during periods when the power and/or fuel cost per unit is high. However, typical energy-reduction implementations involve the installation of control equipment at the HVAC equipment, such as by directly coupling a controller to a furnace. This installation of control equipment has often required that skilled technicians physically install the control equipment at its location, which also often required that the technician have access to customer environment (e.g., access to a customer's home). In addition, typically installations of this type often require a significant amount of technician time, which can be expensive.

Accordingly, the above-discussed issues have been challenging to the implementation of a variety of devices and systems involving climate control and particularly involving the control of HVAC and other equipment in response to price and/or demand conditions.

SUMMARY OF THE INVENTION

To address the issues described above and others that will become apparent upon reading and understanding the present specification, the present invention discloses a system, apparatus and method for addressing challenges related to equipment control and related controller installation.

In accordance with one example embodiment of the invention, a wireless communications device is configured and arranged to control energy-consuming equipment in response to both local control inputs and wireless control inputs received from a gateway. The local control inputs are received, e.g., at the wireless communications device using an input device such as a keypad as is typically used for thermostats. The wireless control inputs originate from a location remote from the gateway, such as a utility provider that configures the control information as a function of one or more of a variety of characteristics or an end-user sending control inputs via the gateway to remotely control the energy-consuming equipment. With this approach, the control of local energy-consuming devices can be effected without necessarily coupling a controller directly to the energy-consuming devices and, in some instances, without necessarily accessing premises at which the energy is consumed. For instance, by wirelessly communicating between a utility gateway and a thermostat wired to an HVAC system, the gateway does not necessarily have to directly couple to the HVAC system.

In a more particular example embodiment of the present invention, the wireless communications device includes a thermostat and circuitry for providing control signals to HVAC equipment using, for example, conventional wired connections commonly used in thermostat applications. The thermostat includes a keypad type device for receiving user inputs at the thermostat for use in controlling the climate in an environment. A wireless transceiver at the wireless communications device communicates with the gateway for passing signals between the gateway and the thermostat, with signals received from the gateway being used to control the HVAC equipment. As with the example embodiment discussed above, this approach facilitates the control of HVAC equipment with control signals sent via the gateway and without necessarily coupling the gateway directly to the HVAC equipment.

BRIEF DESCRIPTION OF THE DRAWINGS

Various example embodiments of the invention are described in connection with the embodiments illustrated in the following diagrams.

DETAILED DESCRIPTION OF THE INVENTION

Figure 1:
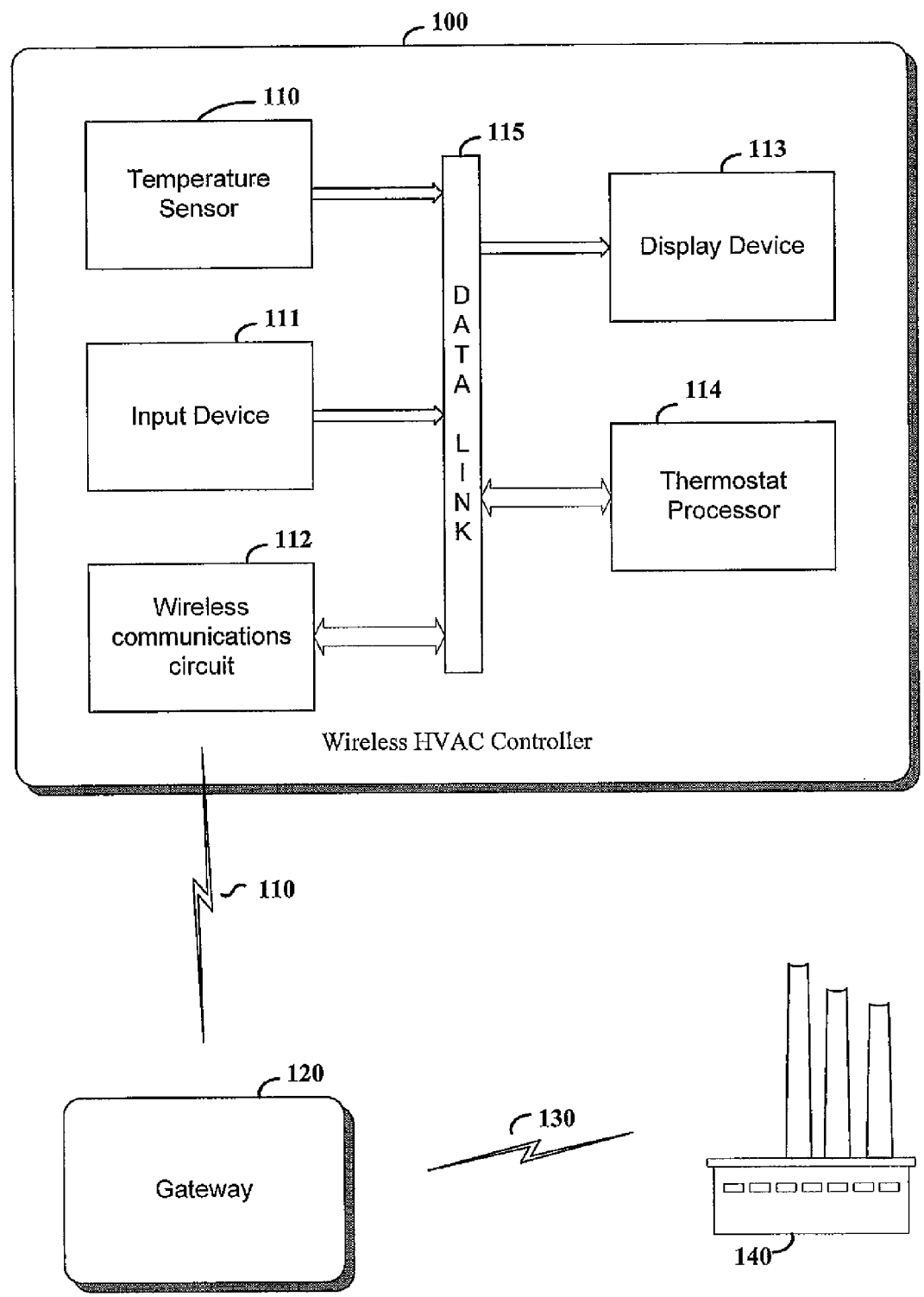
FIG. 1 is an HVAC controller adapted to wirelessly communicate with a gateway for controlling HVAC equipment, according to an example embodiment of the present invention.

In the following description, reference is made to the accompanying drawings which form a part hereof, and in which is shown by way of illustration particular embodiments in which the invention may be practiced. It is to be understood that other embodiments may be utilized, as structural and operational changes may be made without departing from the scope of the present invention.

According to an example embodiment of the present invention, a system controller installed, e.g., at a user-accessible controller location wirelessly communicates with a utility gateway for receiving control signals facilitating external utility control of an electrical and/or fuel-consuming system. The gateway responds to input received from a utility company source by wirelessly sending a control-type signal to the system controller. The system controller responds to the control-type signal by controlling the operation of equipment such as a furnace, air conditioner or water heater, for instance by altering power and/or fuel consumption thereof. With this approach, utility companies can effect control of a local system, such as a residential or commercial HVAC system, without necessarily having to communicate directly with equipment that uses electricity or fuel supplied by the utility company. In addition, this control approach is effected via a system controller, removing any necessity to access the equipment being controlled for installation purposes or to install an interface controller at the equipment being controlled.

The gateway communicates with the utility company using one or more of a variety of types of communications and communications systems. For instance, signals sent to the gateway via telephone lines, wireless telephony systems, paging systems, power lines and the Internet can all be used by the gateway to generate a wireless control-type signal. The gateway responds to signals received from the utility company, for example, by either directly relaying the signal or processing the signal to create another type of signal that is sent to the system controller. The gateway also communicates information received from the system controller to the utility company, for example to allow the utility company to monitor the implementation of utility inputs.

In some instances, different types of communications are used for different types of signals communicated via the gateway. For example, a simple paging signal may be broadcast to a plurality of gateways to initiate an energy-reducing event, with each gateway correspondingly communicating to system controllers using a local radio frequency (RF) signal. Outputs from system controllers communicated by their associated gateways to the utility company may also use more than one communication type, for example with an RF signal between the system controllers and a gateway, and a corresponding wired communication between the gateway and the utility company.

The system controller is communicatively coupled to the equipment being controlled using one or more types of communications links, such as those typically implemented with conventional controllers. For instance, the system controller may include a wall-mounted thermostat wired to a furnace and/or air conditioner and adapted to receive user inputs (i.e., temperature set points) for controlling the system. The wall-mounted thermostat may include, for example, an all-in-one unit with the thermostat being adapted to wirelessly communicate with the gateway, or a thermostat connected to a base having wireless capabilities, for example, as discussed further in connection with FIG. 4.

The system controller also sends wireless signals including information about the equipment being controlled to the gateway. For instance, operational characteristics of an HVAC system can be sent to the gateway and relayed to the utility company to ensure that users do not circumvent the utility company's control effected via the gateway. Such circumvention may be used, in the absence of such monitoring, to override a reduction in energy consumption mandated by the utility company. In addition, information for statistical monitoring of operational characteristics such as temperature set point and others can be sent to the gateway and relayed to the utility company. When time of usage is related to pricing, information regarding the time of consumption can also be sent to the gateway and relayed to the utility company for use in pricing the consumption. These and other informative signals are used for a variety of applications and control implementations involving the wireless gateway and system controller arrangement.

FIG. 1 shows an HVAC controller 100 that communicates with a gateway 120 via a wireless link 110 to control an HVAC system, according to another example embodiment of the present invention. The HVAC controller 100 is located in a user-accessible position, typically within a dwelling or other environment in which an HVAC system operates. For instance, the HVAC controller 100 can be used to replace a conventional wall-mounted thermostat. In this regard, the HVAC controller 100 can be powered either by wiring to a power supply (e.g., as would be done with a conventional thermostat) or with a battery. When used in place of a conventional wired thermostat, communications between the HVAC controller 100 and an HVAC system use the conventional thermostat wiring that couples the HVAC controller to an internal control circuit for the HVAC system (e.g., a printed circuit board enclosed in a furnace). The gateway 120 communicates with a utility company 140 via a communications link 130 (e.g., telephone line, power line or wireless link) for receiving control signals from and for sending information to the utility company.

The HVAC controller 100 includes a wireless communications circuit 112, such as an RF transceiver adapted to communicate between coupled a data link 115 (e.g., local bus) and the gateway 120. The communications circuit 112 is matched with a similar communications circuit at the gateway 120 (e.g., with both employing matched RF transceivers). When the HVAC controller 100 is battery powered, the wireless communications circuit 112 is optionally adapted to enter a low-power mode when not communicating. A thermostat processor 114 (e.g., a microcontroller) processes information received via the data link 115 from an input device 111, temperature sensor 110 and the wireless communications circuit 112. Information including HVAC control information is displayed at a display device 113 as a function of the thermostat processor 114. The thermostat processor 114 further sends information via the data link 115 to the wireless communications circuit 112 for communicating to the utility company 140 (via communications links 110 and 130 and gateway 120). Communications from the HVAC controller 100 to the gateway 120 may include information regarding characteristics of user intervention, such as inputs to the HVAC controller to override energy-saving events, selections made at the HVAC controller and others.

The thermostat processor 114 typically responds to user inputs (e.g., temperature set points and other HVAC control selections received at the input device 111) and to temperature signals received from the temperature sensor 110 by sending a control signal to an HVAC system. User inputs including configuration information can be stored and used by the thermostat processor to automatically respond to utility control signals, for example by comparing the utility control signals to stored inputs relating to participation in an energy-saving event. Under high demand, during a price-controlled event or in other instances warranting external utility control, the utility company 140 sends utility control signals to the HVAC controller 100. In response, the thermostat processor 114 sends control signals to the HVAC system as a function of the utility control signals and/or other programmed settings or inputs. For instance, in response to high electrical usage conditions, the utility company 140 may send a utility control signal to the HVAC controller 100 that instructs the HVAC controller to reduce power usage. In response to the utility control signal, the thermostat processor 114 adjusts control settings for controlling the HVAC system to reduce energy load. This adjustment may include one or more of a variety of responses, such as altering a temperature set point input received via the input device 111 or cycling the HVAC equipment to reduce its operating time. In addition, adjusting control settings for the HVAC system may also include using other data, such as user input data, price tier data or time of day data, when determining or identifying a particular control setting. Depending upon the implementation, circuit configuration and available utility company programs for customer participation, various levels of user control and HVAC controller operation are executed in this manner.

When the high utility demand conditions have passed, control of the HVAC system is released back to the HVAC controller 110. In one implementation, the utility company 140 sends a signal to the HVAC controller 110 to release control of the HVAC system back to the control established by user inputs at input device 111. In another implementation, the utility control signal sent to the HVAC controller 100 includes timing information that sets an interval during which the utility control is to take place. When the timing interval has passed, control is automatically released to the HVAC controller 110.

In some implementations, the wireless communications circuit 112 has a unique identity used in the transmission of signals to the gateway 120 for identifying the wireless communications circuit (and, correspondingly, the HVAC controller 100 and system that it controls). For instance, the gateway 120 may bind to the HVAC controller 100 by polling for the unique identity of the wireless communications circuit 112 during an initialization event where the unique identity is sent to the gateway. During subsequent communications, the gateway 120 uses the unique identity to direct signals to the HVAC controller 100; if the unique identity is not referenced in a particular signal, the wireless communications circuit 112 can ignore the signal. The unique identity can also be used by the gateway 120 to identify a particular HVAC controller 100 sending a signal, for example, when reporting information to the utility company 140. Optionally, the gateway 120 assigns an identifier to each wireless communications circuit to which it binds (e.g., after an initialization event as discussed above) and subsequently uses the assigned identifier to exclusively communicate with the wireless communications circuit. The use of such a unique identity and/or assigned identifier facilitates accurate communications in an arrangement with more than one wireless device, such as more than one HVAC controller 100.

In another implementation, the HVAC controller 100 is adapted to respond to pre-heating or pre-cooling control signals sent by the utility company 140 in advance of a high-demand event. The HVAC controller 100 pre-heats or pre-cools an environment to reduce the effect of the high-demand event in response to the control signals. For instance, when the HVAC controller 100 is controlling heating equipment (e.g., a furnace, electric heater or water heater), the utility company 140 sends a pre-heating signal to the HVAC controller prior to a high fuel or electrical demand event. In response, the HVAC controller 100 increases the amount of heat supplied to increase the temperature in the environment that the HVAC controller serves. When the high-demand event occurs, the utility company 140 sends a signal to the HVAC controller 100 to reduce the heating load exerted on the utility company. Since the environment has been pre-heated, the drop in temperature in the environment relative to a temperature set point is reduced.

In another implementation, the HVAC controller 100 is adapted to display information at the display device 113 to inform users of an energy-saving event. In response, users can selectively chose to participate in the energy saving event via the input device 111, with the selection being wirelessly communicated to the gateway 120 via the wireless communications link 110. The utility company 140 is notified of the participation and responds by sending a signal to the HVAC controller 100 via the gateway 120 to reduce power consumption during the energy saving event.

In another implementation, the HVAC controller 100 is adapted to display pricing tiers for energy usage. For example, the utility company 140 may provide price-per-unit information to the HVAC controller 100 for different times and/or amounts of usage. The price tier information is displayed at the display device 113 and users can respond via the input device 111 by selecting a price tier to participate in. Alternatively (or in addition), price tier acceptance information is stored at the HVAC controller 100 and, in response to price tier information provided by the utility company 140, the stored price tier acceptance information is used to automatically accept and participate in the price tier. With these approaches, users can selectively participate in energy-saving events offered by the utility company 140.

Figure 2:
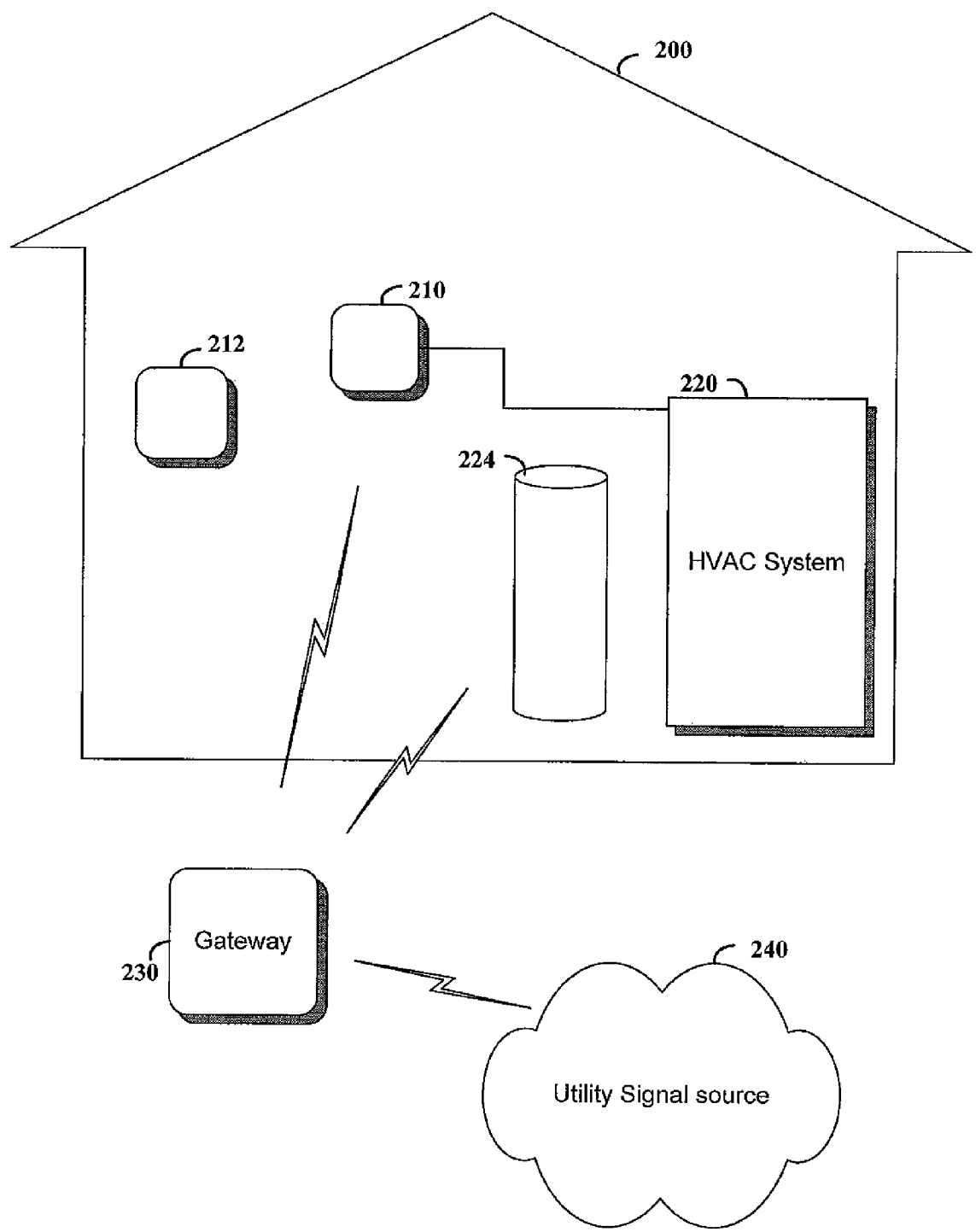
FIG. 2 is system showing a user dwelling with an HVAC system and controller responsive to a utility gateway, according to another example embodiment of the present invention.

FIG. 2 shows a user dwelling 200 (e.g., a house) having an HVAC system 220 and a water heater 224 both controlled with signals sent by a wireless gateway 230, according to another example embodiment of the present invention. The gateway 230 communicates with a utility (or other) signal source 240, such as a radio frequency (RF) broadcast tower, the Internet or a telephone line for sending and receiving signals as described in connection with the gateway 120 of FIG. 1. A wireless thermostat 210, similar to the wireless HVAC controller 100 of FIG. 1, receives wireless information from the gateway 230 for controlling the HVAC system 220. For example, during a high-demand period, signals sent from the utility signal source 240 to the gateway 230 to reduce energy consumption (power and/or fuel) at the HVAC system 220 are passed to the wireless thermostat 210. In response, the wireless thermostat 210 uses inputs received from the gateway 230 to override inputs received from users at the wireless thermostat for controlling the operation of the HVAC system 220. The wireless thermostat 210 also communicates characteristics of the HVAC system 220 to the gateway 230, for example to facilitate the monitoring of user inputs at the wireless thermostat or operational characteristics of the HVAC system 220.

The water heater 224 is communicatively coupled to the gateway 230 via either a wired or wireless connection and thereby receives control signals from the utility signal source 240. In one implementation, the water heater 224 includes a wireless controller similar to the controller 100 shown in FIG. 1 and communicates wirelessly with the gateway 230. In response to wireless signals received from the gateway 230 and to user inputs received at the controller at the water heater 224, the controller adjusts the operation of the water heater. The adjustment may, for example, include lowering a temperature setting during an energy-saving event or raising a temperature setting to pre-heat the water prior to an energy-saving event. User selections made at the water heater 224 and/or operational characteristics thereof are optionally sent to the utility signal source 240 via the gateway 230 for monitoring purposes.

In a more particular implementation, the dwelling 200 includes two or more wireless thermostats including wireless thermostats 210 and 212, each adapted to wirelessly communicate with the gateway 230. Each wireless thermostat is selectively controlled by signals received from the gateway 230 as a function of programming at the gateway. For example, the gateway 230 can be programmed to control both wireless thermostats 210 and 212 similarly, with wireless signals sent from the gateway being received by both thermostats.

Alternately, the wireless thermostats 210 and 212 can be programmed differently for different control approaches. For instance, when a user has different heating or cooling zones in the dwelling 200, he or she may be more amenable to having certain zones controlled by signals received via the gateway 230. Heating or cooling zones for which the maintenance of predefined temperatures is not as important, such as a basement or garage, may be prime candidates for facilitating energy reduction. In this regard, thermostats that control the temperature in these zones are used to reduce the energy consumption of the HVAC system 220 by adjusting temperature set points in these zones accordingly.

In another example embodiment of the present invention, a gateway facilitates remote control of energy consuming equipment in an environment by users of the environment. Referring to FIG. 2 by way of example, a user owner of the dwelling 200 sends control signals from the signal source 240 to the gateway 230 (e.g., with the signal source 240 including a user access source, such as the Internet, via which the user enters control signals). The gateway 230 sends wireless information to the wireless thermostat 210, which controls the HVAC system 220 in response thereto. With this approach, users can remotely control HVAC equipment or other equipment via the gateway, either in addition to or separate from any utility-based control.

Figure 3:
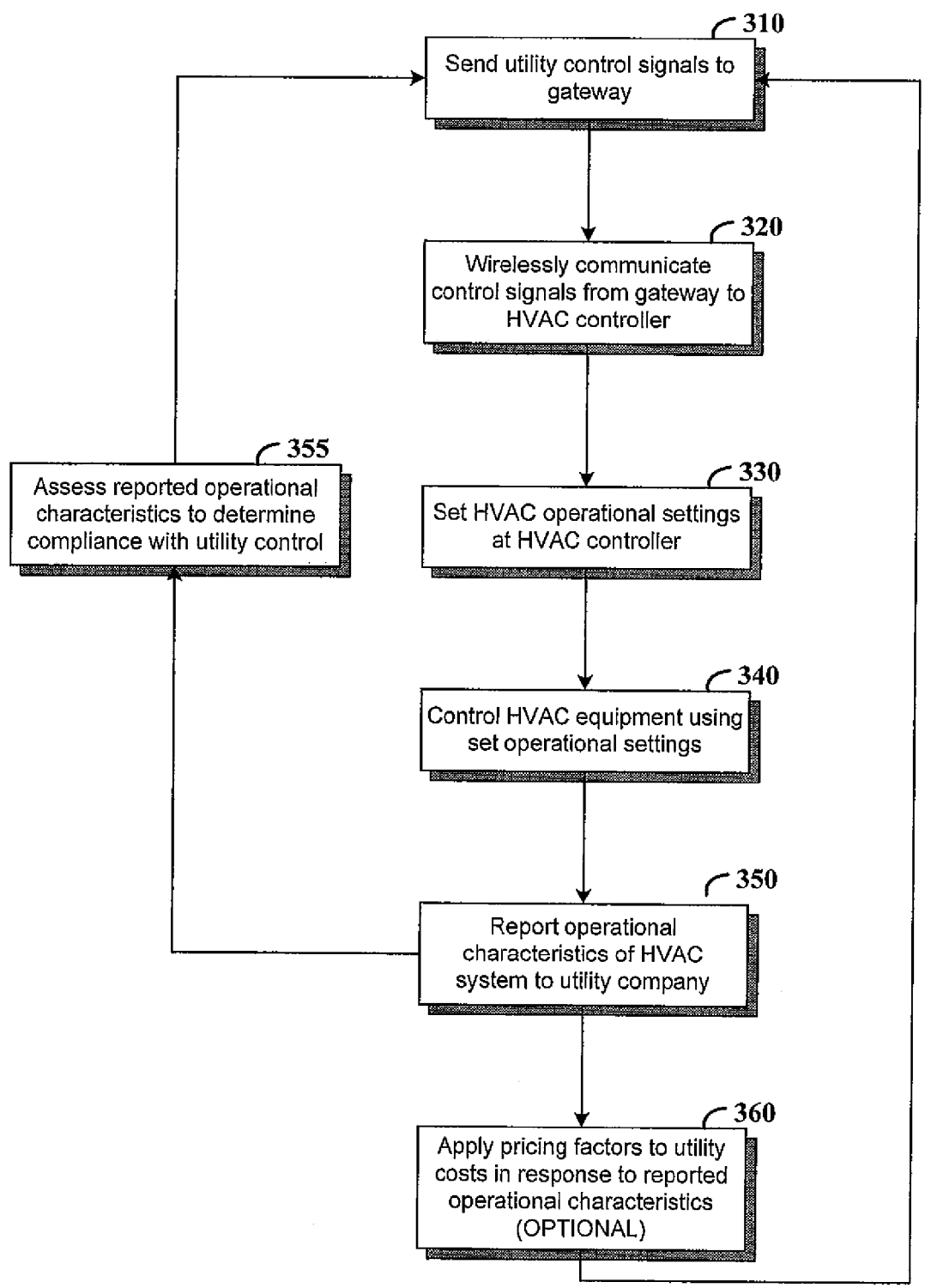
FIG. 3 is a flow diagram for controlling an HVAC system with signals sent via a gateway, according to another example embodiment of the present invention.

FIG. 3 shows a flow diagram of an approach for controlling an HVAC system with remote utility signals sent through a wireless gateway, according to another example embodiment of the present invention. The approach shown in FIG. 3 may be implemented, for example, with other embodiments discussed herein such as the controller shown in FIG. 1 and/or the approach shown in FIG. 2. At block 310, utility control signals are sent to a local gateway located within wireless transmission range of a wireless controller for HVAC equipment. At block 320, the gateway wirelessly communicates control signals to a wireless HVAC controller, for example, by directly relaying control signals received at block 310 or by processing the control signals to generate new control signals for the wireless HVAC controller.

At block 330, HVAC operational settings are set at the HVAC controller in response to the control signals, which are selected to achieve one or more of a variety of control characteristics. For instance, during peak load times, control signals sent from the utility company can be selected to set the HVAC controller to override and/or work with user inputs and to operate the HVAC system in a reduced consumption mode. Once the peak load time has passed, control signals indicating so and sent from the utility company are used to set the HVAC controller to control the HVAC system as a function of user inputs received at the HVAC controller. At block 340, these operational settings set in response to the control signals at the HVAC controller are used to control HVAC equipment, for example, by supplying control inputs to the equipment from the HVAC controller. With this approach, the HVAC equipment is remotely controlled from a utility company without necessarily accessing the HVAC equipment, facilitating installation of the on-site control capability with the HVAC equipment.

After the HVAC operational settings are set at the HVAC controller, the HVAC controller sends actual operational characteristics to the utility company via the gateway at block 350 to assess the control of the HVAC equipment. The reported operational characteristics are assessed by the utility company at block 355 and used to send additional utility control signals to the gateway at block 310. A variety of characteristics can be sent to the utility company at block 350 and assessed at block 355. For example, user selections made at the HVAC controller can be reported back to the utility company to enable active control and participation in energy savings events. Utility control signals sent at block 310 can then be tailored to these user selections. As another example, actual operating conditions of the HVAC equipment as detected at the HVAC controller (e.g., actual run-time characteristics) can be sent to the utility company for monitoring purposes to ensure that users do not circumvent utility control. Other characteristics, such as the actual temperature of the environment at which the HVAC controller resides, can also be reported, assessed and used to send control signals to the gateway. By controlling the HVAC system via the HVAC controller, these and other parameters available at the controller but not typically available at the equipment itself can now be assessed at the utility company. Alternatively, these actual operating conditions can be used for statistical purposes, such as for energy planning and scheduling.

In another implementation, pricing factors are applied to utility costs in response to the reported operational characteristics at block 360. The pricing factors may include, for example, a time-of-day usage factor or energy saving event factor, wherein costs for the particular utility being used (e.g., electricity or fuel) are assigned as a function of these factors. For instance, if peak load times for electrical power happen during mid-afternoon on hot summer days, the utility company may wish to charge a premium for providing cooling energy during these peak periods. In this regard, operational characteristics of the HVAC system that are reported at block 350 via the gateway are used to assign a price to a portion of the energy use that falls during this peak period. Characteristics of these pricing factors are optionally reported back to the HVAC controller via the gateway and displayed for viewing by users. This approach is readily implemented, for example, with the approaches discussed above wherein users can selectively participate in energy-saving events and/or make other selections sent from the HVAC controller to the utility company via the gateway.

Figure 4:
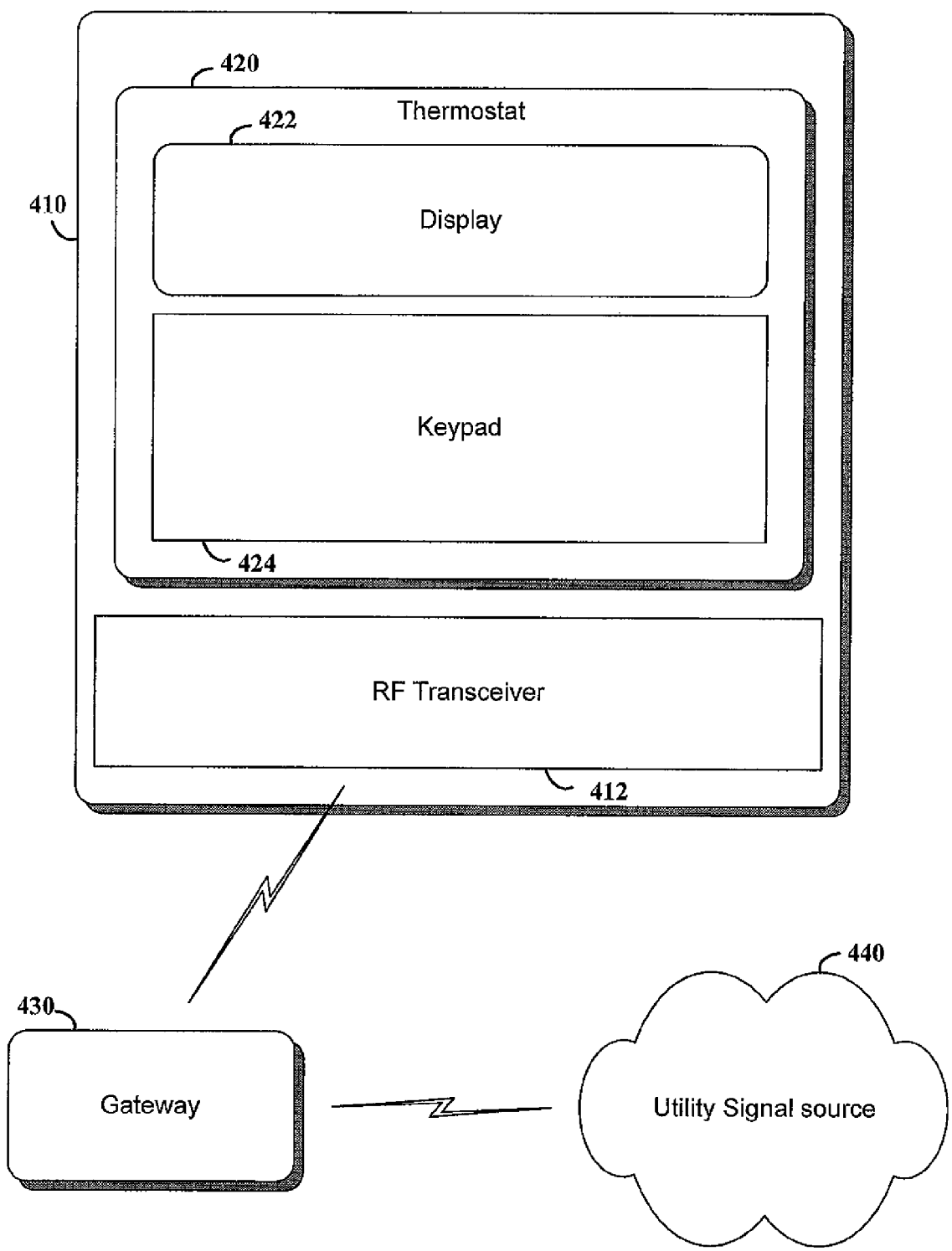
FIG. 4 is a radio frequency (RF) thermostat base arrangement adapted to couple to a thermostat and to wirelessly communicate with a gateway for passing signals between the gateway and the thermostat, according to another example embodiment of the present invention.

FIG. 4 is an RF thermostat base arrangement 410 coupled to a thermostat 420 and adapted to pass signals between the gateway and the thermostat, according to another example embodiment of the present invention. The base arrangement 410 includes an RF transceiver 412 and a built-in antenna that wirelessly communicate with the gateway 430, which in turn communicates with a utility signal source 440. The thermostat 420 includes a keypad 424 and a display 422 respectively adapted for receiving inputs and for displaying data. The base arrangement 410 couples to the thermostat 420 to apply control inputs thereto and to receive reporting characteristics and/or user selections therefrom. Keypad inputs may include, for example, typical thermostat-type inputs such as temperature set points for time of day and/or day of week, fan control inputs, immediate temperature control inputs and others. In addition, the keypad inputs may include user selections to be communicated to the utility signal source 440.

Inputs received via the RF transceiver 412 can be used to override user inputs received at the keypad 424 in response to an energy saving event communicated by the utility signal source 440. For instance, when the thermostat 420 is programmed to be responsive to the utility signal source for reducing energy usage, inputs received at the keypad 424 for establishing temperature set points are overridden to enable the energy saving event to control the thermostat. In addition, the keypad 424 is optionally adapted to enable users to opt out of an energy saving event, which returns control of the thermostat 420 to the user via the keypad 424. In this instance, the decision to opt out of the event is communicated to the gateway 430, which sends a corresponding signal to the utility signal source 440 to inform the utility company of the decision. Similarly, the thermostat 420 is optionally programmed to automatically accept or opt out of participation in energy-saving events as a function of characteristics at the thermostat. For instance, the thermostat 420 can be programmed to decline participation in an energy saving event as a function of temperature sensed at the thermostat (e.g., to prevent freezing or overheating).

Figure 5:
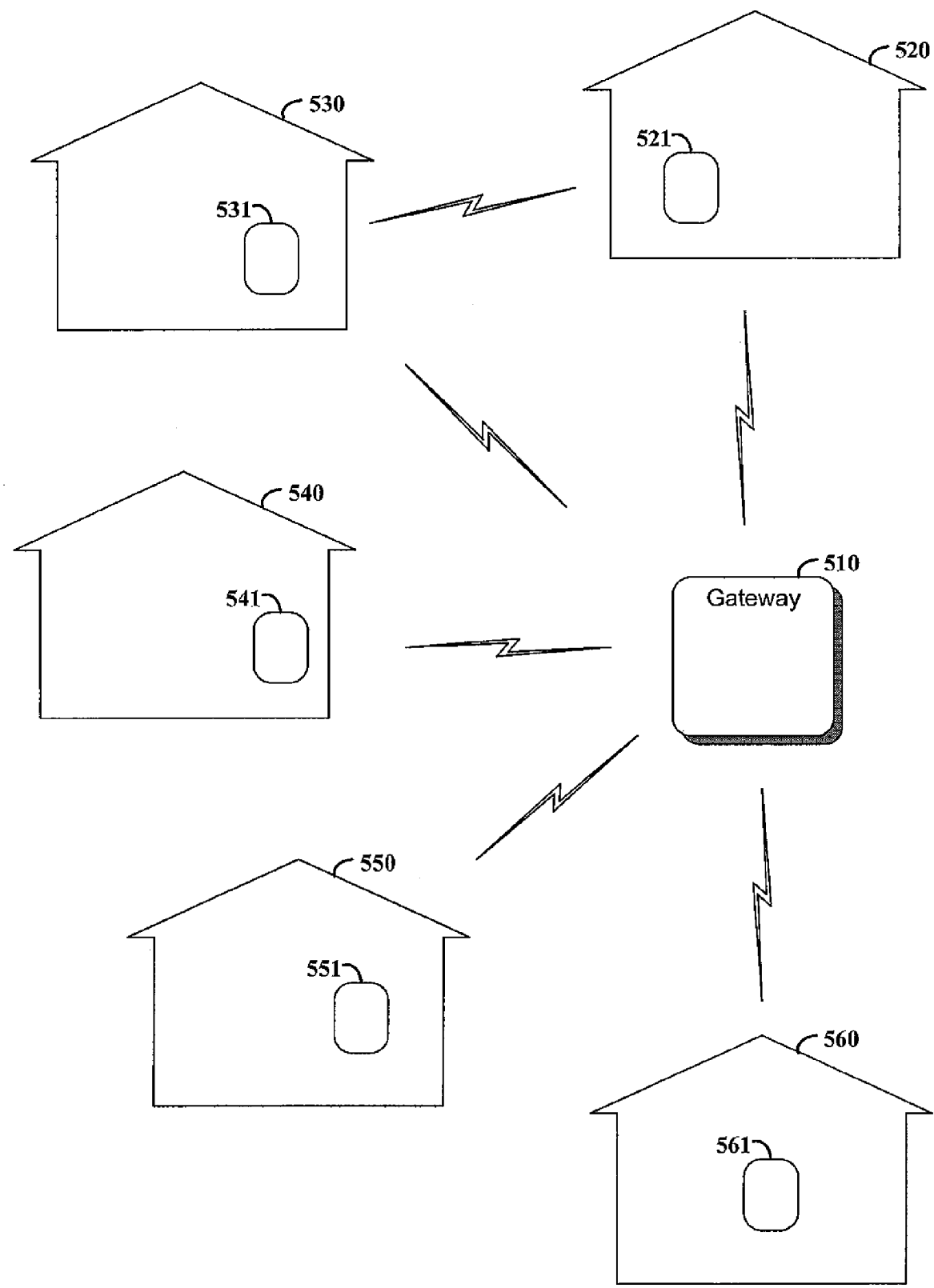
FIG. 5 shows a system including a gateway adapted to communicatively couple to a plurality of thermostats located in different environments and to pass signals between a utility signal source and the plurality of thermostats, according to another example embodiment of the present invention.

FIG. 5 shows a utility control system including a gateway 510 adapted to pass signals between a utility signal source and a plurality of thermostats, according to another example embodiment of the present invention. The gateway 510 is located within wireless range of wireless thermostats for each of locations 520, 530, 540, 550 and 560 (e.g., homes, commercial buildings). For example, when used in residential neighborhoods, the gateway 510 can be located on a telephone pole, on the outside of one of a home or other useful location. In response to signals received from a local utility company, the gateway 510 sends a wireless communication to each of the wireless thermostats 521, 531, 541, 551 and 561. The wireless thermostats respond to the signals from the gateway 510 by controlling HVAC equipment accordingly, for example as a function of programmed settings at the wireless thermostats or other conditions relative to participation of the locations in utility-based energy consumption control. The wireless thermostats 521-561 also send wireless information to the gateway 510, which can be used for identifying and monitoring the thermostats as discussed above.

Communications between the gateway 510 and each wireless thermostat may, for example, use a binding process for establishing proper communications therebetween and for identifying a particular wireless thermostat for sending and/or receiving signals. Such a binding process may involve assigning identifiers to each of the wireless thermostats 521-561, with the gateway 510 using the individual identifiers, or a range identifier values assigned to the thermostats, for identifying signals from the wireless thermostats. For general information regarding wireless communications and for specific information regarding binding approaches that may be used in connection with one or more example embodiments discussed herein, reference may be made to U.S. patent application Ser. No. 10/792,028, entitled "Wireless Association Approach and Arrangement Therefor" filed concurrently herewith and fully incorporated herein by reference.

In one implementation, the gateway 510 sends a single RF signal that is received by each of the wireless thermostats 521-561 in response to signals received from a utility company. The wireless thermostats respond to the RF signal by controlling energy consumption at their respective locations as a function of programming at the particular wireless thermostats. For instance, when a signal received at the gateway 510 from a utility company calls for reduced consumption, the gateway responds by sending a request to reduce consumption to all of the wireless thermostats 521-561. Each wireless thermostat responds in one or more of a variety of manners, for example, by changing temperature set points to reduce power consumption, by cycling HVAC equipment or by ignoring the gateway if a non-participation mode is set. Operational characteristics of the wireless thermostats and corresponding HVAC systems that each wireless thermostat controls are then sent to the gateway 510 for communication to the utility company. With this approach, individual signals need not necessarily be tailored for each wireless thermostat to which the gateway 510 is communicating. However, feedback from each wireless thermostat in response to the signals can still be individually obtained and identified.

In another implementation, the gateway 510 is programmed to tailor signals for one or more of the wireless thermostats 521-561. For example, the signals for a particular wireless thermostat can be tailored to match a particular energy savings plan subscribed to by the location controlled with the wireless thermostat. Using wireless thermostat 521 as an example, user selections made at the wireless thermostat are sent to the gateway 510 and stored for use in establishing utility control, using binding or another approach to control communications between the wireless thermostat and the gateway. These user selections may include, for example, types of energy savings events to participate in, levels of participation (e.g., how much of a reduction in energy usage or how many degrees in temperature set points change when requested) and others. When the gateway 510 receives signals from a utility company, the signals are processed as a function of the selections stored at the gateway for the wireless thermostat 521. A signal is then generated for and sent to the wireless thermostat 521 as a function of both the utility company signals and the stored selections. This approach is also applicable, for example, to the use of multiple wireless thermostats in a single environment using an approach similar to that discussed in connection with FIG. 2 above, with each thermostat having signals tailored specifically for it. In this regard, individual thermostats in a single environment can be selectively controlled.

In another example embodiment, the wireless thermostat 531 is configured and arranged to relay information between the gateway 510 and other HVAC controllers. For instance, when the gateway 510 receives a signal from a utility company for controlling energy, the signal is passed to the wireless thermostat 531 and correspondingly relayed to the wireless thermostat 521. Any response of the wireless thermostat 521 is sent to the wireless thermostat 531 and relayed to the gateway 510. With this approach, utility company based energy control can be effected using fewer gateways, effectively using a relay approach to extend the range of the gateway 510.

In another example embodiment, the wireless thermostat 531 includes the gateway 510 and is adapted to communicate directly to a utility signal source. In addition to controlling HVAC equipment in the location 530, the wireless thermostat 531 also functions as the gateway 510 for the wireless thermostats in locations 520, 540, 550 and 560 (and others within range of the gateway). With this approach, the installation of utility control systems can be simplified. For instance, when installing such a system in a neighborhood including locations 520-560, a first location subscribing to utility energy control can be fitted with a combined wireless thermostat and gateway. Using location 530 as an example with wireless thermostat 531 including a gateway, subsequent installations in the neighborhood that are within communication range of location 530 are then communicatively coupled to the wireless thermostat 531. Utility energy control of subsequent installations in locations 520, 540, 550 and 560 is correspondingly effected using the wireless thermostat 531 as a gateway, similar to the approach discussed above using gateway 510 for these locations.

Figure 6:
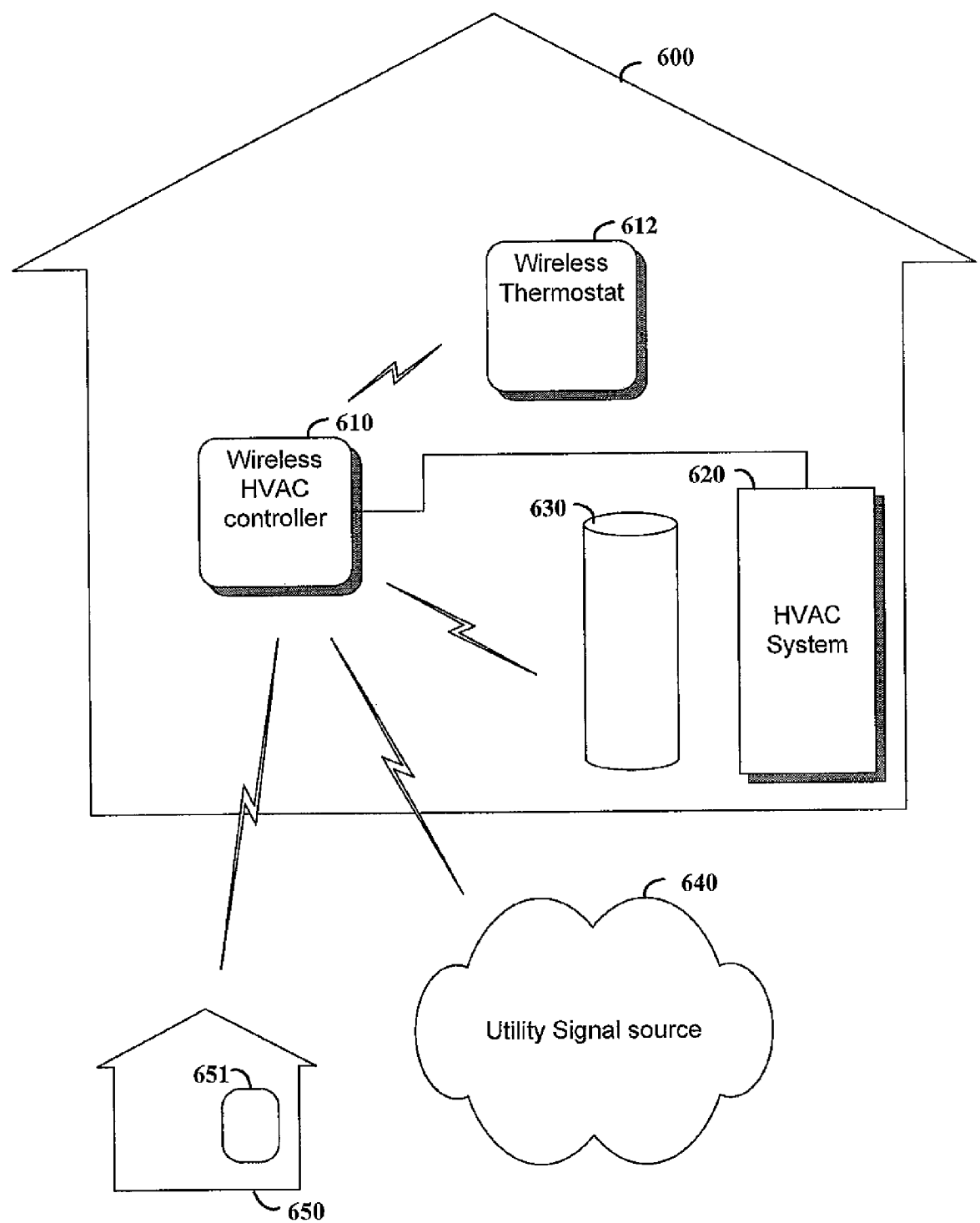
FIG. 6 is an HVAC system controller configured and arranged to wirelessly communicate directly with a utility provider, according to another example embodiment of the present invention.

FIG. 6 shows a wireless HVAC controller 610 configured and arranged to wirelessly communicate with a utility provider via a utility signal source 640 for controlling equipment at user location 600, according to another example embodiment of the present invention. The wireless system controller 610 may, for example, be used in connection with the example embodiment discussed in connection with FIG. 5 wherein the wireless thermostat 531 includes the gateway 510. The wireless HVAC controller 610 includes a wireless transceiver for communicating with the utility signal source 640 and with additional wireless HVAC controllers including wireless thermostats 612 and 651, respectively at user locations 600 and 650. Using binding or another approach, each wireless HVAC controller to be controlled with the wireless HVAC controller 610 is identified for establishing specific communications and reporting characteristics for each wireless HVAC controller back to the utility company. The wireless HVAC controller 610 controls an HVAC system 620 using wired or wireless connections, for example, as with a conventional thermostat and/or in a manner similar to that discussed in connection with FIG. 1 above.

A plurality of energy-consuming devices can be controlled with the wireless HVAC controller 610. For instance, a water heater 630 is optionally controlled using the wireless HVAC controller 610 as a gateway, with control signals received from the utility signal source 640 being used to control the water heater. The wireless HVAC controller 610 is coupled to the water heater 630 using a wired or wireless link. In one implementation, the wireless HVAC controller 610 acts effectively as a gateway for communicating with the water heater 630, as discussed above in connection with FIG. 2 and the gateway 230. In another implementation, the wireless HVAC controller 610 also controls the water heater 630, for example in response to user set points input at the wireless HVAC controller.

Figure 7:
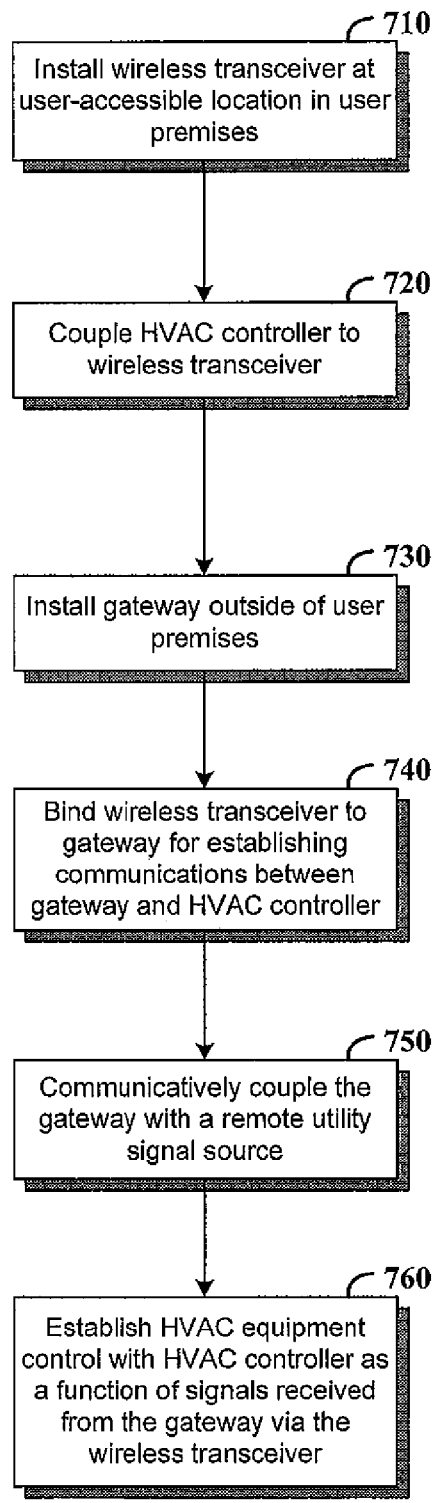
FIG. 7 is a flow diagram for an installation approach involving remote utility control, according to another example embodiment of the present invention.

FIG. 7 shows an approach for installing and operating an HVAC control system, according to another example embodiment of the present invention. The approach shown in FIG. 7 may be implemented, for example, to install control systems and to facilitate control approaches discussed herein. At block 710, a wireless transceiver is installed at a user-accessible location at a user premises, such as at a wall-mounted thermostat location. At block 720, an HVAC controller such as a thermostat is coupled to the wireless transceiver. A gateway is installed outside of the user premises at block 730, for example on the exterior of a home or on a local utility pole. At block 740, the wireless transceiver is bound to the gateway for establishing communications between the gateway and the HVAC controller. At block 750, the gateway is communicatively coupled with a remote utility signal source, for example simply by powering the gateway and/or by initiating a binding or other recognition-type process. HVAC equipment control is established at block 760 with the HVAC controller as a function of signals received from the gateway via the wireless transceiver. For instance, temperature set points controlled at block 760 can be used to control the corresponding operation of the HVAC equipment via existing wiring to which the HVAC controller is coupled (e.g., at block 720). With this approach, utility-based control of HVAC equipment can be effected using an installation process that is relatively short and does not necessarily require access to HVAC equipment.

The foregoing description of various example embodiments of the invention has been presented for the purposes of illustration and description. It is not intended to be exhaustive or to limit the invention to the precise form disclosed. Many modifications and variations are possible in light of the above teaching. For example, a wireless controller for a multitude of energy-consuming appliances can be used in place of the controllers described herein (e.g., in place of the HVAC controllers). It is intended that the scope of the invention be limited not with this detailed description, but rather by the claims appended hereto.

What is claimed is:
1. A wall mountable thermostat having a housing assembly for use in controlling an HVAC system of a building or other structure, the building or other structure having a local gateway coupled to a communications network, the thermostat comprising:
    a user interface for allowing a user to interact with the thermostat;

a wireless transceiver in the housing assembly for wirelessly communicating with the local gateway of the building or other structure, wherein the local gateway is located remotely from the thermostat;

a temperature sensor for sensing a temperature inside the building or other structure and for providing a signal related to the sensed temperature; and a thermostat controller coupled to the user interface, the wireless transceiver and the temperature sensor, the thermostat controller having a control algorithm for controlling the HVAC system based, at least in part, on one or more control parameters, the thermostat controller configured to receive an electrical signal from the wireless transceiver to allow a user to control the HVAC system as a function of user inputs received from a remote location on the communications network via the local gateway and the wireless transceiver separate from any utility based control application, to override user inputs received via the user interface.

2. The wall mountable thermostat of claim 1 wherein the housing assembly includes:

a thermostat housing and a thermostat base, wherein the thermostat housing is removably coupled to the thermostat base such that when the thermostat housing is coupled to the thermostat base, one or more electrical signals can be communicated between the thermostat housing and the thermostat base; and the thermostat housing carrying the user interface, the temperature sensor and the thermostat controller, and the thermostat base carrying the wireless transceiver.

3. The wall mountable thermostat of claim 2 wherein the thermostat base is configured to be mounted to an interior wall of the building or other structure.

4. The wall mountable thermostat of claim 3 wherein the thermostat base includes one or more wire connectors, wherein the one or more wire connectors are configured to accept and retain one or more control wires for the HVAC system.

5. The wall mountable thermostat of claim 1 wherein the thermostat controller is configured to provide one or more operational characteristics of the HVAC system to the remotely located gateway via the wireless transceiver, which can then be viewed from a remote location on the communications network via the local gateway.

6. The wall mountable thermostat of claim 1 wherein the gateway is located outside of the building or other structure.

7. The wall mountable thermostat of claim 1 wherein the HVAC system includes an air heating component.

8. The wall mountable thermostat of claim 1 wherein the HVAC system includes an air cooling component.

9. The wall mountable thermostat of claim 1 wherein the wireless transceiver is an RF transceiver.

10. The wall mountable thermostat of claim 1 wherein the wireless transceiver enters a low power mode when not communicating with the remotely located gateway.

11. The wall mountable thermostat of claim 1 wherein the wireless transceiver is configured and arranged to bind to the gateway during initialization.

12. The wall mountable thermostat of claim 1 wherein the thermostat controller is configured to receive one or more user inputs from the remotely located gateway via the wireless transceiver, and provide one or more user responses, wherein the one or more user inputs allow a user to remotely control the thermostat.

13. A zoned HVAC system having two or more zones, comprising:

a local gateway;

a first thermostat for controlling a first zone of the zoned HVAC system, the first thermostat having:

a first wireless transceiver for wirelessly communicating with the local gateway of the building or other structure;

a first controller coupled to the first wireless transceiver, the first controller having a first control algorithm for controlling the HVAC system based, at least in part, on one or more first control parameters, the first controller configured to allow a user to change one or more of the first control parameters from a remote location on the communications network via the local gateway and the first wireless transceiver;

a second thermostat for controlling a second zone of the zoned HVAC system, the second thermostat having:

a second wireless transceiver for wirelessly communicating with the local gateway of the building or other structure;

a second controller coupled to the second wireless transceiver, the second controller having a second control algorithm for controlling the HVAC system based, at least in part, on one or more second control parameters, the second controller configured to allow a user to change one or more of the second control parameters from a remote location on the communications network via the local gateway and the second wireless transceiver;

wherein the first thermostat further includes:

a first housing and a first base, wherein the first housing is removably coupled to the first base such that when the first housing is coupled to the first base, one or more first electrical signals can be communicated between the first housing and the first base; and the first housing carrying the first controller, and the first base carrying the first wireless transceiver;

wherein the second thermostat further includes:

a second housing and a second base, wherein the second housing is removably coupled to the second base such that when the second housing is coupled to the second base, one or more second electrical signals can be communicated between the second housing and the second base; and the second housing carrying the second controller, and the second base carrying the second wireless transceiver.

14. The zoned HVAC system of claim 13 wherein the first base and the second base are each configured to be mounted to a wall of the building or other structure.

15. The zoned HVAC system of claim 14 wherein the first base and the second base each include one or more wire connectors, wherein the one or more wire connectors are configured to accept and retain one or more control wires for the zoned HVAC system.

16. A method for changing one or more operating parameters of a thermostat, wherein the thermostat includes a housing assembly and is located inside of a building or other structure, comprising:

sending a first request to change a desired operating parameter of the thermostat from a location outside of the building or other structure separate from any utility based control application, the first request passing across a communications network to a local gateway, wherein the local gateway is located inside of the building or other structure;

sending a second request from the local gateway to a wireless transceiver in the housing assembly of the thermostat, the second request is in response to the first request;

sending an electrical signal that corresponds to the second request from the wireless transceiver to a thermostat controller of the thermostat;

in response to receiving the electrical signal, the thermostat controller changing the desired operating parameter of the thermostat; and the thermostat controller operating the thermostat using the changed operating parameter.

17. The method of claim 16, wherein the wireless transceiver is in the housing assembly of the thermostat.

* * * * *